United States Patent [19]

Degens

[11] 4,158,713

[45] Jun. 19, 1979

[54] COMPOSITION BOARD WITH IMPROVED POLYMERIC SKIN AND METHOD OF PREPARING SAME

[76] Inventor: Alfredo Degens, 952 Ave. Delfim Moreira, Rio de Janeiro, Brazil

[21] Appl. No.: 871,147

[22] Filed: Jan. 20, 1978

Related U.S. Application Data

[62] Division of Ser. No. 693,197, Jun. 7, 1976, Pat. No. 4,083,744.

[51] Int. Cl.² .............................................. B32B 7/02
[52] U.S. Cl. .................................. 428/212; 156/278; 156/306; 428/280; 428/282; 428/284; 428/286; 428/288; 428/290; 428/507; 428/511; 428/514; 428/530; 428/531; 428/535; 428/537; 428/219
[58] Field of Search .............. 428/284, 280, 282, 286, 428/288, 290, 507, 511, 514, 530, 531, 535, 537, 212, 219; 156/278, 306

[56] References Cited

U.S. PATENT DOCUMENTS

| | | | |
|---|---|---|---|
| 4,083,743 | 4/1978 | Degens | 156/278 |
| 4,083,744 | 4/1978 | Degens | 156/306 |

*Primary Examiner*—Marion E. McCamish
*Attorney, Agent, or Firm*—Richard P. Crowley

[57] ABSTRACT

A flexible, integrally bonded sheet material suitable for use as a face surface covering on a composition board, which sheet material comprises: first and second fibrous sheet materials bonded together by a cured thermosetting resin, the first sheet and at least a portion of the second sheet impregnated with a cured thermosetting resin, the face surface of the first sheet material characterized by a cured thermosetting resin surface, and the back surface of the second sheet material consisting essentially of fibers and capable of absorbing into the fibrous surface of the second sheet material an adhesive material for bonding purposes.

10 Claims, 6 Drawing Figures

COMPOSITION BOARD WITH IMPROVED POLYMERIC SKIN AND METHOD OF PREPARING SAME

This is a division of application Ser. No. 693,197, filed June 7, 1976 (now U.S. Pat. No. 4,083,744, issued Apr. 11, 1978).

BACKGROUND OF THE INVENTION

Composition boards like particle boards or other substrates with a thin, hard, formica-like top surface covering are well known. Typically, the surface comprises a cured thermoset resin in a translucent, opaque or printed sheet which is secured to one surface of the board to provide a wear- and stain-resistant surface, such as, for example, in kitchen counter tops, wall coverings, furniture and the like.

A prior art standard method (the high-pressure method) of preparing such composition boards has been to prepare a thick resin-cured laminate overlay sheet typically with four or more underlay sheets of resin-impregnated kraft paper. The overlay sheet is prepared under high pressure and resin-curing temperatures, and the back surface of the laminate sanded or roughened. The laminate, for example, with a conventional thickness of about 0.35 inches, is then glued by means of low or contact-pressure adhesives to the composition board surface. This method requires multiple underlay sheets to provide a cured laminate overlay of sufficient strength to be handled and sanded.

Another technique for producing such composition boards (the low-pressure method) is also used, but likewise has several disadvantages.

In one method, a board core; that is, usually a thick layer of wood chips bonded together by a resin with a thickness ranging from about 0.25 cm to 5.0 cm or more, is used as a base, and a thin, transparent, opaque or printed sheet, which is impregnated with a curable thermoset resin, such as a melamine-formaldehyde resin, is bonded to the top surface of the board by subjecting it to heat and pressure sufficient to effect simultaneously the curing or fusing of the melamine-formaldehyde resin in the sheet.

In such operation, care must be taken not to employ too much pressure, since pressure, for example, in excess of 10 or 20 kilos per square centimeter or above, often alters or weakens the mechanical and structural properties of the underlying board. In any event, the use of such pressure always reduces the thickness of the board in some degree. Care must be taken also in the selection of the board, since a board usually has a relatively rough surface created by larger particles or chips of wood, and, for example, of more than about 0.3 mm± variation in thickness, would be unacceptable, since the underlying surface defects of the board may be telegraphed through the thin sheet to cause undesirable ripples and surface defects on the top cured surface.

Attempts have been made to overcome this defect by employing wood chips of particularly graded particle size on the surface of the board, but this is expensive and involves another process step. In addition, efforts have been made to smooth; e.g., to presand or presurface, the board surface to make it more acceptable and to raise it into a higher-quality surface board, which is also expensive.

A method of overcoming these problems and of telegraphing has been to select a very short heat cycle and to restrict the amount of pressure involved; for example, a heat cycle of only 30 to 90 seconds, and a pressure typically below 20 kilos per square centimeter, such as 5 kcm or lower. By this operation, telegraphing and deterioration of the particle board by heat and pressure is minimized and reduction in thickness of the board is minimized also. The top surface of the board prepared in this manner, however, does not present a fully cured resin surface on the thin sheet, but rather a less than fully cured thin top sheet which is more porous in nature than a fully cured sheet, which is subject to high heat and high pressure and longer curing times. The top surface, by being more porous and not fully cured, does not have the high-heat and temperature-resistant properties which would be desirable, and such top surfaces exhibit a reduced resistance to chemicals and stains and a low-resistant surface to abrasion, wear and scratches which is unsatisfactory for many uses.

A further technique employed to overcome the problems associated with telegraphing by the rough surface of a board has been to employ a relatively thick kraft or alpha paper which is impregnated with a thermoset curable resin as an underlay between the thin resin-impregnated top sheet and the rough surface of the board. By this process, lower-quality or rough-type particle boards can be employed and telegraphing prevented. One difficulty associated with the technique is that it involves extra expense and cost through the use of the kraft or alpha paper underlay, and further there is often a visible "show-through" of the phenolic resin impregnated in the kraft paper. In addition, although this technique prevents telegraphing, it still does not permit the use of very high pressures nor the preparation of a fully cured and high stain-, scratch-, abrasion- and wear-resistant top surface in the low-pressure process.

An economic disadvantage associated with the low-pressure process is that any surface defects discovered in the thin top surface result in the discarding of the entire board or at least a reduction in size or trimming of the entire board. Therefore, it is most desirable to prepare a composition board having a thin, fully cured, polymeric, thermoset skin without the disadvantages of the foregoing low -or high-pressure techniques, and which board with the thin skin will exhibit high-heat temperature, high stain, scratch and abrasion resistance.

SUMMARY OF THE INVENTION

My invention relates to an improved, flexible, fully cured, resin-impregnated sheet material suitable for use as a surface on a composition board or other substrate, to an improved laminate, such as a composition board, prepared with my cured sheet material secured thereto, and to the method of preparing the cured resin sheet material and the improved laminate.

I have discovered a novel and unique flexible, cured, thin sheet material comprising at least first and second fibrous sheet materials bonded together, which integrally bonded sheet material is suitable for use as a surface covering, and to a process of preparing such integral sheet material. In the process of preparing my sheet material, I provide a first, thin, fibrous sheet material impregnated with a curable thermosetting resin, such as a condensable resin like a heat-curable melamine-formaldehyde resin, impregnated into a thin cellulosic sheet material, such as alpha cellulose, which thin sheet material may be a printed, opaque or translucent sheet.

The process includes placing into contact with one surface of the first curable resin-impregnated sheet material a second flexible fibrous sheet material, such as, for example, a sheet material like kraft or alpha paper. The second fibrous sheet material is adapted to serve as a carrier for the first sheet material for bonding the sheet to a substrate. The surface of the second sheet is further capable of absorbing an adhesive material therein in one embodiment while being bonded to a substrate material and prior to bonding in another embodiment. The process includes then subjecting the first and second sheet materials to a high pressure; typically a pressure of over about 20 kilos per centimeter square (k/cm$^2$), and at a thermosetting resin-curing temperature and for a period of time in a press to cure the resin in the first sheet, and to bond the one surface of the second fibrous sheet material, contacting the first fibrous sheet material by the resin flow and subsequent cure, to the surface of the first fibrous sheet material.

Such a process provides an integral, flexible, integrally bonded sheet material of the first and second sheet materials, in which the top surface is characterized by a nonporous, hard, stain- and wear-resistant, fully resin-cured surface, and an opposite surface which is composed of the underlay paper which is capable of absorbing an adhesive material, such as a vinyl-acetate material like polyvinyl-acetate resin.

The integrally bonded sheet material so produced may then be adapted for use as a surface covering on one or both sides of a substrate, such as a composition board like a particle board. In operation, the sheet material is placed on the surface of the composition board which has a layer of an adhesive material thereon, and the adhesive material on the board in one embodiment is thereby absorbed into the underlay surface of the sheet material, while the sheet material is pressed into contact with the board surface at a low contacting pressure to produce a final laminate product of the thin surface covering bonded to the composition board surface.

In one embodiment, the second underlay sheet material may have a layer of an adhesive material thereon or coated or impregnated; e.g., to a depth of up to about 50%, therein prior to pressing together of the first and second sheets. The first and second sheets are placed in a press so that, during the pressing and heating operations, the curable resin in the first sheet flows under heat and pressure into the upper contacting uncoated surface of the second sheet. The cured resin bonds the first and second sheets into a unitary integral sheet with a top surface of cured resin and with a back surface of a dry adhesive.

For example, a melamine resin-impregnated alpha cellulose first sheet with sufficient excess resin therein is used with a polyvinyl-acetate-coated second sheet of alpha or kraft paper. During the pressing operation, the melamine resin flows into the upper uncoated surface of the second sheet and the resin cures to bond the sheets together. This technique is a variation of my invention described in U.S. patent application Ser. No. 693,198, filed June 7, 1976 (now U.S. Pat. No. 4,083,744, issued Apr. 11, 1978), hereby incorporated by reference, wherein a single, thin, curable, resin-impregnated sheet is rendered flexible and suitable for bonding without sanding by impregnating the sheet material during the pressing operation with a layer of a compatible adhesive material into one surface of the sheet.

In another preferred embodiment, which is a further variation of the above-described technique, the second fibrous sheet material is an absorbent sheet initially free of resin or adhesive material; i.e., a dry sheet, into which the resin of the first sheet flows and is cured to bond the first and second sheets together. The integral sheet has a cured resin top surface and a back surface capable of absorbing an adhesive material; i.e., it is not resin-impregnated, since the resin impregnates only a portion of the depth of the second sheet. The sheet material after the pressing operation is a thin flexible sheet easy to manipulate and ready for bonding to a substrate by absorption of an adhesive layer on the surface of the substrate. As in the other techniques, the top surface is a fully cured resin surface which is abrasion-, chemical-, wear- and stain-resistant and is free of adhesive material. In both embodiments, the cured bonding resin in the second sheet penetrates to varying depths, but typically to an average of not more than about 50% in depth; although in certain areas, due to variations in penetration, the resin may even penetrate to the back surface, but in insufficient amounts to affect the subsequent bonding of the surface to the substrate.

In both embodiments, the sheet material may be bonded at low or contact pressure and at room or low temperature, usually less than 60° C., to a substrate surface having a layer or coating of an adhesive material thereon. For example, the substrate surface, such as one or both surfaces of a composition board like a particle board, is coated with a glue spreader or curtain wall applicator with a natural or synthetic glue or adhesive material in an amount sufficient to bond the sheet to the substrate surface, and typically in the preferred embodiment, in an amount to be absorbed into the dry back surface of the sheet and to bond and fully impregnate the sheet to the substrate.

The substrate coating may vary in thickness, for example, 1 to 20 mils or more, and often is in a solvent or emulsion form which is first dried in an oven to evaporate the water, alcohol or other organic solvents to leave a tacky adhesive layer. The adhesive material may be the same or a similar adhesive material as used in the one embodiment, or may be any contact-type adhesive material. Suitable adhesive materials include, but are not limited to, the vinyl adhesive materials like vinyl-acetate resins, such as the vinyl esters of short-chain $C_2$–$C_6$ acids, particularly vinyl-acetate resins and copolymers, such as polyvinyl-acetate emulsions, as well as heat-curable amino resins like urea-formaldehyde resins and combinations thereof with polyvinyl-acetate resins, resorcinol-type resins, starches and other glues and combinations thereof.

In the bonding operation, the sheet material of either embodiment is laid on the coated surface, and, with slight pressure by nip rolls with or without heat, is placed into contact with the substrate surface. In the preferred embodiment, the adhesive material flows into the absorbable dry fibers of the lower side of the underlay to provide a strong bond. Of course, if desired the dry underlay sheet may be coated in a separate operation with an adhesive prior to being placed into contact with the coating layer on the substrate.

An important advantage of my sheet material is that the material may be easily handled, and the back surface does not need to be sanded or roughened prior to bonding to the substrate, as is required with the thick laminate of the high-pressure process. My sheet material can, therefore, be quite thin, but with the top resin-cured surface having all the properties of the thicker laminate, while avoiding the use of multiple underlays and the sanding operation.

By employing a fibrous underlay material integrally bonded to one surface of the fully impregnated resin-cured sheet material and incorporating a resin binder into at least a portion of the depth of the underlay material, leaving the opposite surface with an adhesive or free to absorb an adhesive material, either in situ or from a coating layer on a substrate, I have provided a flexible sheet material with many advantages.

My technique provides for the thin resin-impregnated first sheet material forming the top surface to be subject to a desirable high pressure and temperature, and to be cured fully so that it is not porous and exhibits excellent chemical and physical strength and resistance, in comparison to such sheets which are cured in a short-cycle operation. Typical pressures which might be employed in my operation would range from over 20 kilos per centimeter square, such as from 30 to 100 kilos per centimeter square (k/cm$^2$). In addition, due to the thinness of the two sheet materials and since the composition board does not have to be heated to high temperatures or be subject to high pressures, which is often detrimental to the physical and chemical properties of the board, as well as a reduction in thickness of the particle board, many more of my first and second sheet materials may be placed in a high-pressure press and heated, and although the heat cycle may be longer than the low-pressure process, my process is more economical and produces a high-quality top surface.

Another advantage of my invention is that the resulting sheet material can be examined and defects removed, if any, prior to bonding to the substrate or to the particle board, thereby avoiding discarding the entire board and reducing cost and waste. Furthermore, as will be evident, the production efficiency and rate can be considerably increased in high-pressure presses, since the resin sheet is subject to high temperature and pressures without the presence of the entire board, thereby permitting a higher production rate of the high-pressure press.

My integrally bonded nonfrangible sheet material permits the use of a lower-quality composition board or other substrate materials with rougher surfaces than previously used, since the adhesive material, such as the polyvinyl acetate, or any resin-compatible adhesive glue material employed on the substrate surface, can fill in the variations in a rough surface, so that surface variations of the substrate are minimized or not telegraphed through the hard, fully cured, integrally bonded sheet material. Thus, for example, boards and other surfaces having surface variations, for example, of up to ±0.3 mm, can be used in the preparation of surface-covered substrates.

A further advantage, of course, is by the use of lower pressures and temperatures in the bonding of the cured integrally bonded sheet material to a substrate, the thickness of the composition board is not reduced as in the past practice, wherein higher pressures are employed and/or higher temperatures. In fact, the integrally bonded thin sheet is an added thickness to the substrate surface.

The sheet materials employed are typically fibrous sheets, for example, 0.1 to 0.5 mm in thickness, such as nonwoven materials of natural or synthetic fibers, for example, cellulose, typically having a basis weight of from about 20 to 200 grams per square meter (g/sm); e.g., 40 to 120 g/sm. The first sheet is typically a thin alpha cellulose sheet fully impregnated with a curable, cross-linkable thermoset resin material, typically a condensable resin material, such as an amino-resin material like a melamine resin, such as melamine-formaldehyde resin, as well as a urea-formaldehyde resin or urea, dicy, benzoguanamine and other water- or alcohol-soluble condensable amino resins or phenol-formaldehyde resins, alone or in cocondensable mixtures thereof with other materials and additives. The resin content of the dried sheet typically ranges from about 30 to 70% by weight of the resin. The impregnated sheet may be relatively translucent or opaque, or it may be colored or have a printed decorative design thereon which is desired for the surface. The first sheet material is typically thin, and often only one sheet is employed; although several resin-impregnated sheets of varying designs or combinations or a transparent top sheet and an underlying printed sheet may be used in combination.

The second sheet material may vary in thickness and absorbency and may have a basis weight range like the first sheet, and typically comprises a cellulosic sheet material, such as of alpha cellulose or kraft paper, or other cellulosic fibrous, nonwoven, absorbent, calendered or uncalendered sheet materials adapted to absorb an adhesive material. The sheet may have sufficient thickness if desired to form an underlay sheet material to prevent or minimize the telegraphing of surface defects from a substrate to the face surface of the fully cured resin sheet material. Of course, where the substrate is relatively smooth, the thickness of the underlying second fibrous sheet material may be substantially reduced, since the second sheet then functions primarily as a carrier for the fully cured first sheet material.

My cured sheet material may be secured by the selected adhesive, or any combination of adhesives, to any hard substrate surface without sanding the back surface of the sheet, particularly a cellulosic-based hard surface or supporting surface, such as hard board, plywood, natural wood, wallboard, composition board comprising wood fibers and hardened resin, such as a particle board, and similar sheet materials which are employed in use for furniture, counter tops, wall surfaces and the like. The sheet material may be adhesively bonded to one or both surfaces of the substrate.

For the purpose of illustration only, my invention will be described in its preferred embodiment, wherein a cured sheet material is adhesively bonded by a particular adhesive to the top surface of a particle board. However, it is recognized and is within the spirit and scope of my invention that changes and modifications may be made in the described embodiment, by those persons skilled in the art, which are within the scope and understanding of my invention.

DESCRIPTION OF THE EMBODIMENTS

Figure 1:
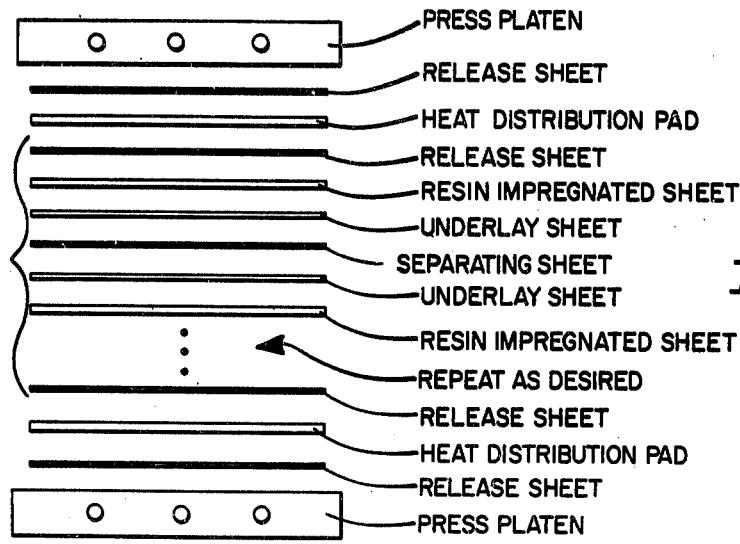
FIG. 1 is a schematic illustration of an enlarged exploded view of the process for curing first and second fibrous sheet materials to form an integrally bonded sheet material of my invention.

FIG. 1 illustrates the bonding of a fibrous underlay sheet material, such as a kraft paper, in a high-pressure-heated press with a melamine-formaldehyde resin-impregnated sheet material, such as a thin alpha cellulosic sheet material. As illustrated, a pair of steam or electrically heated press platens employ on each side a release sheet, a heat-distribution pad, and a first melamine-formaldehyde resin-impregnated sheet, together with an underlay sheet. The release sheet adjacent the heat-distribution pad may also be a press plate; e.g., of polished metal. The release sheets employed are silicone-treated papers; e.g., silicone resin-coated paper, which may be used against the top surface of the first resin sheet, but in my process should not be employed in contact with the back surface of the second sheet, since such release papers tend to reduce the absorbency of the back surface to the adhesive, particularly a polyvinyl-acetate resin.

Thus, as illustrated, a separating paper sheet without silicone is employed adjacent the back surface of the second sheet. The first and second sheet combination with separating sheets is repeated as desired to the extent of the press cavity, with, for example, from 20 to 60 combinations being capable of being produced in one opening in the typical high-pressure press. Press platens, therefore, enclose a plurality of sheet materials in which the sheet materials in the platens are subject to pressures of from about 35 k/cm². The melamine-formaldehyde resin-impregnated sheet is saturated with the curable resin and has resin on the surface. The amount of resin in the sheet is controlled by the pickup during the impregnation process. Sufficient curable resin is used to impregnate or saturate the paper, and sufficient additional resin to flow into the underlay sheet to a small bonding depth.

Rather than employing a short cycle of 60 to 90 seconds of heating and pressing, as in the low-pressure process, my time cycle is longer to ensure for a full cure of the resin in the integrally bonded material. For example, a heat cycle of about 3 to 60 minutes, typically such as, for example, from about 10 to 20 minutes, is used to provide a fully cured flexible sheet material. However, my productivity is higher than in the short cycle due to the larger number of sheets in each opening of the press.

In the operation described and in the preferred operation, the resin-impregnated sheet material is fully impregnated with the melamine-formaldehyde resin, while the underlay sheet material of the kraft paper is or has a layer of adhesive material. In the pressing operation, a portion of the resin (Stage B) of the resin-impregnated alpha cellulosic sheet material is forced to flow into the contacting surface of the kraft paper, and the resin cured to bond securely the kraft paper to the surface of the cured resin-impregnated sheet.

In operation, the first resin-impregnated sheet and the second sheet underlay (basis weight about 35 to 80 g/m²) in the press are subject to pressures of 25 to 80 k/cm²; e.g., 35 k/cm², at a curing temperature of above 90° C. to 180° C., such as 105° to 150° C., for a time cycle of 10 to 20 minutes.

The overlay press cycle to be employed depends on a number of factors, including, for example, the temperature of the heating medium, the temperature and velocity of the cooling water, and also the number of sheets placed in an opening of the press. Unlike the prior art high-pressure process, a large number of my thin sheets can be placed in the press opening; e.g., 30 to 60 sheets per opening, and thus in a multiple-opening press, overall production of the sheets is enhanced, even though the press cycle is longer than in the prior art low-pressure process.

The mechanical cycle is the time period between the closing and opening of the press, while the heat cycle is the time period during which the sheets are subject to the resin-curing temperature while in the press. The mechanical cycle may vary, for example, from 20 to 40 minutes, depending upon the press and conditions used, while the heat cycle may vary, depending on the heat transfer requirements which are related to the number of sheets in the press and the use or nonuse of metal press plates and other factors. The heat cycle is shorter where a catalyst resin is used and longer where a non-catalyst resin is used; e.g., as low as 3 minutes or lower to as long as 40 minutes or more.

In one embodiment, a high-pressure press was used with 50 sheets per press opening with no press plates used, and with a nonsilicone separating sheet used to separate each assembly of sheets. The overall mechanical cycle was between 28 to 30 minutes. The press was closed at 70° C., the pressure reached was 35 k/cm², the heat cycle curing time was 12 to 14 minutes for a non-catalyst melamine resin, and the heat cycle temperature range was about 105° to 121° C. On reaching a temperature of about 116° C., the cooling of the press is started to bring the press to its starting temperature. The resulting sheet material was a flexible and non-frangible sheet of the type described.

After pressing, the sheet material may be handled in the normal course of manufacture without excessive cracking or crazing, and may be inspected for defects at this stage and stored in sheet form for use later in preparing the laminate.

Figure 2:
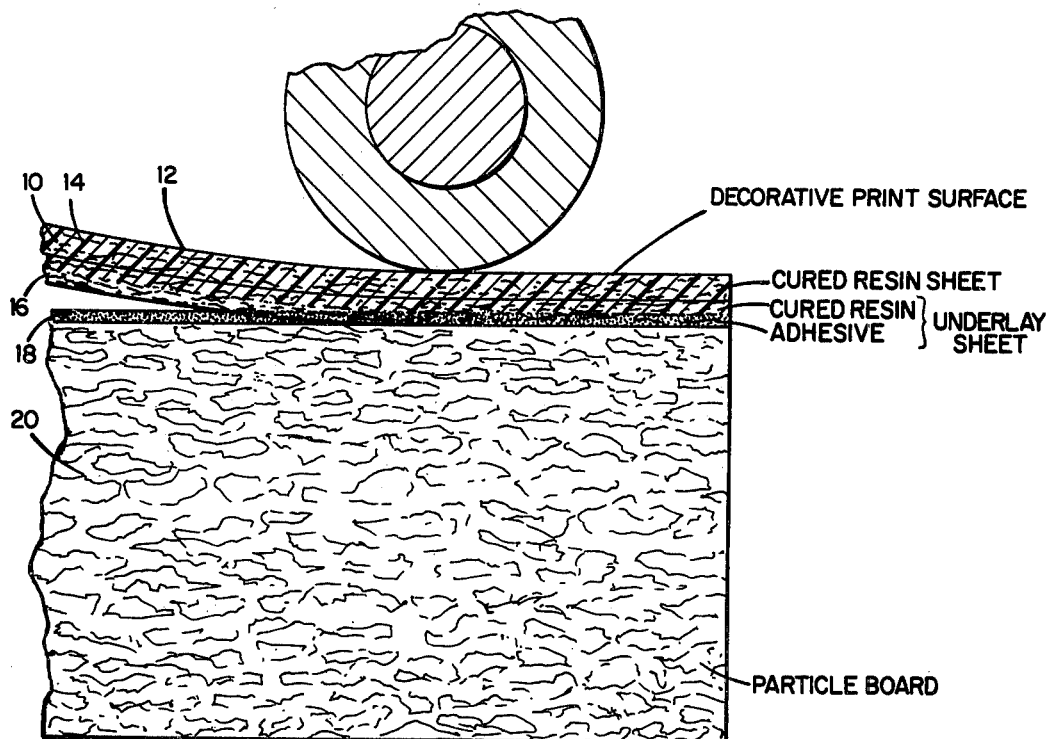
FIG. 2 is a schematic enlarged illustration of the process of securing my cured integrally bonded sheet material to the surface of a particle board.

FIG. 2 illustrates the process of securing my integrally bonded sheet material to a selected substrate, such as a composition board, wherein the sheet material 10 is passed through a pair of opposing rollers and a low contacting pressure applied by the rollers to force the material 10 into contact with an adhesive-coating layer 18; e.g., a tacky or semiliquid polyvinyl-acetate resin on the surface of a particle board 20. The particle board shown is a composite wood-chipped, resin-bonded particle board having a rough surface, which normally would telegraph its surface defects through to the top surface of the first sheet.

The particle board is coated with a thin coating of from about 0.1 to 20 mils of an adhesive whose solvent; e.g., water where an emulsion is used, has been evaporated or reduced, such as in a heated funnel oven. The adhesive layer is slightly wet or presents a tacky surface layer, which resin adhesive is absorbed into the lower dry fibrous underlay surface of the material 10. Some of the adhesive material layer is absorbed by the substrate surface of the board. Therefore, the adhesive layer should be sufficient to be divided between the substrate and underlay for proper bonding. Where the underlay surface has an adhesive material already therein, then less adhesive material may be used on the substrate surface. Telegraphing of surface defects in the particle board 20 is minimized on the hard cured sheet material containing the decorative print surface 12, due to the low pressure and low temperature used to bond adhesively the sheet material. The soft particle board 20 is not reduced in thickness by pressure nor weakened by heat in the adhesive-bonding operation, and an additional thickness of, for example, 0.5 mm is added to the board.

As illustrated, the integrally bonded sheet material 10 comprises a decorative, fully cured, print surface 12 and is impregnated with a fully cured thermoset melamine-formaldehyde resin 14 throughout the first sheet and at least a portion of the second sheet, with the remaining surface of the kraft paper on the second sheet absorbing the vinyl-acetate adhesive layer 18 into the dry surface 16. The pressure employed is typically only sufficient pressure to force the integrally bonded sheet material 10 into contact with the particle board, with only sufficient temperature or room temperature used to bond the sheet material to the particle board. Where the polyvinyl-acetate emulsion is applied to the surface of the particle board to form a coating layer 18, the polyvinyl-acetate forms a tacky surface, which adhesive is absorbed into the underlay surface of sheet material 10 through the pressure of opposing rolls, and then the material is placed aside for trimming, cutting or other operations.

Figure 3:
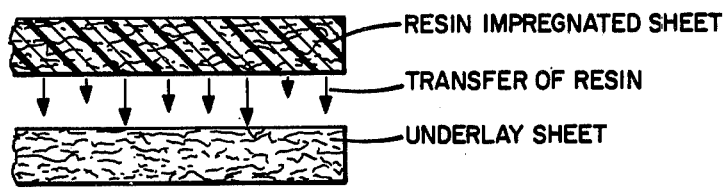
FIGS. 3 and 4 are schematic illustrations of the sheet material of one embodiment of my invention.

FIG. 3 schematically illustrates the irregular flow and transfer of the curable resin from the resin-impregnated sheet into the dry underlay sheet during the high-press operation. The length of the flow arrows varies to illustrate that the resin does not penetrate the underlay uniformly, but varies and typically averages up to 50% or more, particularly to 25%, of the depth.

Figure 4:
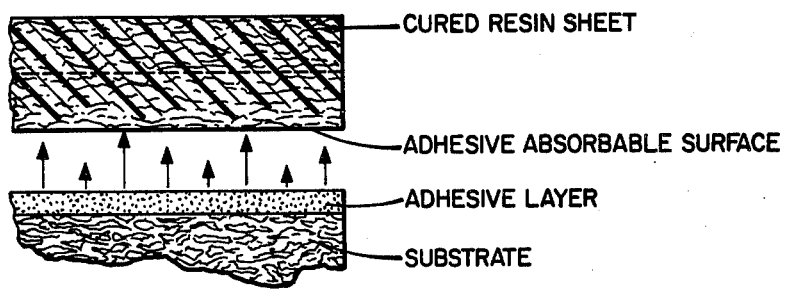

FIG. 4 schematically illustrates the composite-bonded sheet after the pressing operation, and illustrates the irregular cured resin-adhesive parting line, and shows that the flow of adhesive from the adhesive coating layer on the substrate is also irregular, and that the adhesive fills up the absorbable depth of the bonded sheet to form a perfect low-pressure bond between the substrate and back surface of the bonded sheet.

Figure 5:
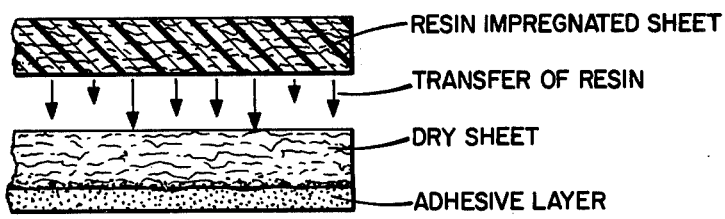
FIGS. 5 and 6 are schematic illustrations of the sheet material of another embodiment of my invention.

FIG. 5 is a schematic illustration of the one embodiment of a curable resin-impregnated sheet showing the irregular flow and transfer of the resin from the sheet into the adhesive-coated underlay sheet, with the adhesive layer illustrated as irregularly penetrating a portion of the depth of the underlay sheet to form an adhesive line between the adhesive-impregnated depth and the dry or nonadhesive portion of the sheet prior to pressing.

Figure 6:
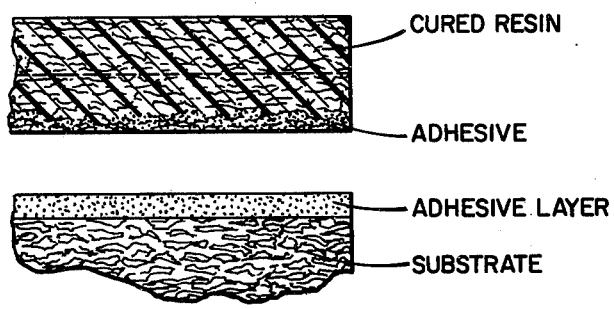

FIG. 6 is a schematic illustration of the bonded sheet produced by FIG. 5, with the cured (C stage) resin and adhesive meeting at an irregular, cured, resin-adhesive line within the sheet. The substrate surface has an adhesive layer thereon to bond the bonded sheet to the substrate. In this figure, no illustrative flow arrows are shown, since the adhesive layer on the substrate would not flow irregularly, but bond directly with the compatible adhesive-rich surface of the bonded sheet. It is also recognized that the adhesive used in the bonded sheet and the adhesive on the substrate may be the same or different adhesive, and further that the adhesive during the pressing operation and the resin may intermingle and flow together, as in my copending application, so that no sharp adhesive-resin line is formed. My bonded sheet material is thinner than the laminates of the high-pressure process, and does not require the back surface to be sanded or roughened to secure good contact bonding to the board.

The finished laminate product from my method may be employed as a kitchen counter top or for furniture surfaces or for other uses as desired, as is well known. My fully cured, thin, integrally bonded sheet material and its employment with and on particle boards as a finished laminate material provide superior and unexpected results and advantages over prior art materials and processes.

What I claim is:

1. A flexible, nonfrangible, integrally bonded composite sheet material suitable for use as a face surface covering on a substrate, which sheet material comprises: first and second fibrous sheet materials bonded together by a cured thermosetting resin, the first sheet having a basis weight of from about 20 to 200 $g/m^2$ and prior to bonding to the second sheet having from about 30 to 70% by weight of a curable thermosetting resin, the second sheet having a basis weight of from about 20 to 200 $g/m^2$ and adapted to serve as a carrier sheet for the first sheet material and bonded to the first sheet by the cured resin from the first sheet, the first sheet and at least a portion of the second carrier sheet impregnated and bonded together with a cured thermosetting resin, the face surface of the first sheet material characterized by a cured, hard thermosetting-resin face surface adapted for use on a composition board, and the back surface of the second sheet material capable of absorbing into the fibrous back surface of the second sheet material an adhesive material for bonding the integrally bonded composite sheet material to a substrate surface, the sheet material having a thickness of from about 0.1 to 0.5 mm, the composite sheet material being flexible and capable of being handled without fracture thereof.

2. The sheet material of claim 1 wherein the cured resin is a melamine-formaldehyde resin or a urea formaldehyde resin.

3. The sheet material of claim 1 wherein the first sheet is an alpha cellulosic paper sheet, and the second sheet is cellulosic paper sheet.

4. The sheet material of claim 1 wherein the surface of the second sheet material is impregnated with an adhesive material to bond the integral sheet material to a substrate.

5. The sheet material of claim 4 wherein the adhesive material is impregnated up to an average depth of about 50% of the second sheet.

6. The sheet material of claim 4 wherein the adhesive material is polyvinyl-acetate resin.

7. A laminate product having a surface covering, which product comprises:
    (a) a substrate; and
    (b) the sheet material of claim 1 wherein the back surface of the second sheet material is impregnated with an adhesive material, the adhesive material bonding the back surface of the integrally bonded sheet material to at least one surface of the substrate to form a surface covering.

8. The product of claim 7 wherein the substrate is a composition board.

9. The sheet material of claim 1 wherein the first sheet material has a basis weight of from about 40 to 120 $g/m^2$ and the second sheet material has a basis weight of from 35 to 80 $g/m^2$.

10. A flexible, nonfrangible, integrally bonded composite sheet material suitable for use for bonding to a substrate as a surface covering, which sheet material comprises:
    (a) a first cellulosic sheet material having a basis weight of from about 20 to 200 $g/m^2$ and fully impregnated from about 30 to 70% by weight with a cured melamine-formaldehyde resin;

(b) a second cellulosic paper sheet material having a basis weight of from about 20 to 200 g/m², one surface of which is bonded to the first sheet material by a portion of the cured resin of the first sheet material penetrating into a portion of up to about 50% of the one surface of the second sheet material; and (c) the other back surface of the second sheet material characterized by a fibrous surface which contains therein a vinyl-acetate resin adhesive material throughout the remaining resin-free depth of the second sheet material to provide an adhesive-rich back surface adapted to be bonded to a substrate, the first and second sheet materials having a thickness of about 0.1 to 0.5 mm. each.

* * * * *